United States Patent Office 2,699,043
Patented Jan. 11, 1955

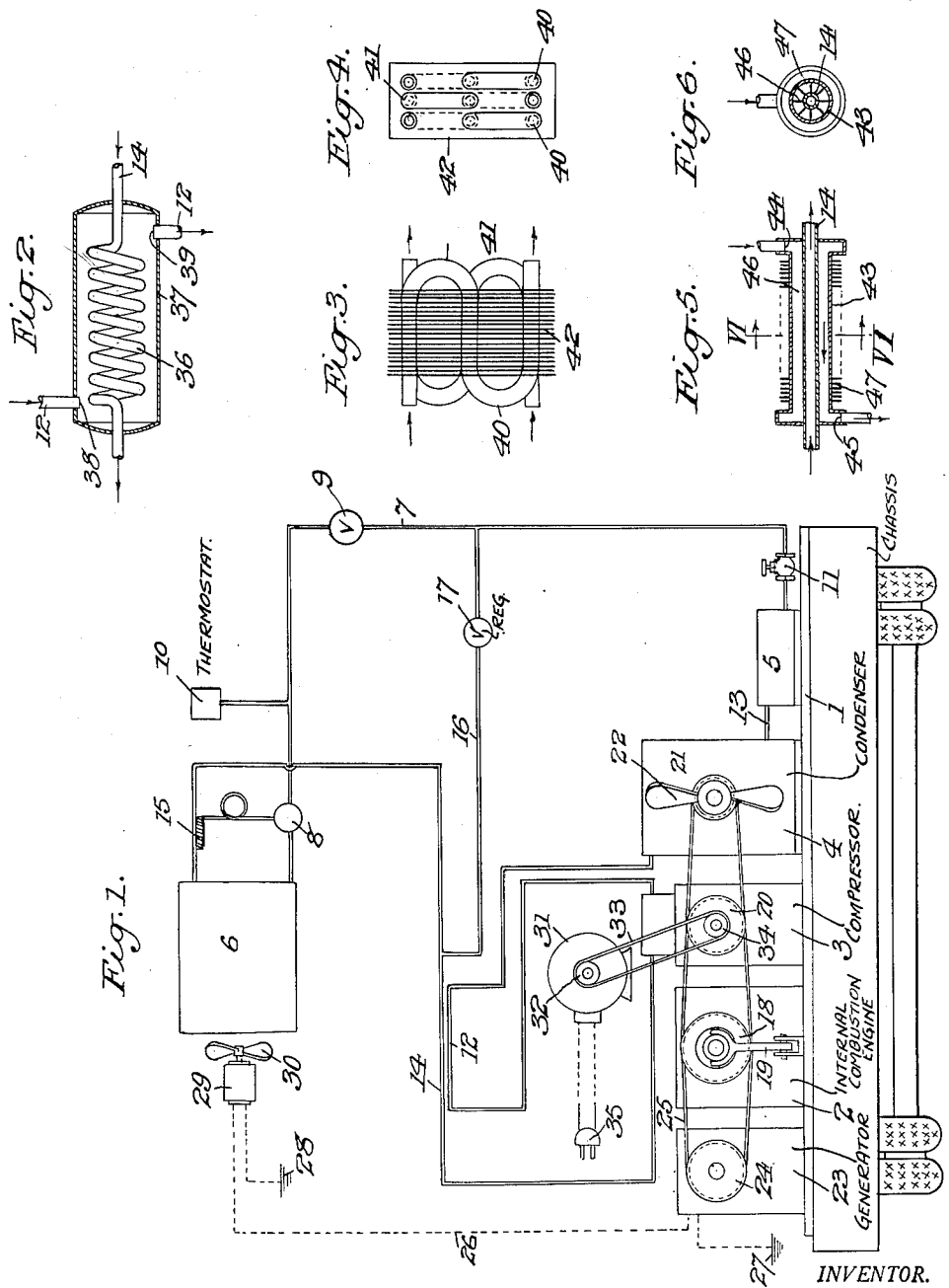

2,699,043

REFRIGERATION SYSTEM PROVIDED WITH BALANCING MEANS AND ADAPTED FOR INSTALLATION ON VEHICLES

Israel Kramer, Trenton, N. J., assignor to Mercer Engineering Co., Trenton, N. J., a copartnership Application October 4, 1950, Serial No. 188,294

7 Claims. (Cl. 62—3)

This invention relates to heat exchange apparatus, and more particularly, to a refrigerating system, and has for an object to provide such an apparatus which includes means, preferably automatic, for balancing the refrigerant pressure in the system regardless of variations in the heat load of the evaporator and regardless of the revolution speed of the compressor.

Another object is to provide such an apparatus which is adapted for installation on an engine driven vehicle, such as a truck, and for operation whether the truck be moving or at a standstill.

Another object is to provide such an apparatus which includes means for maintaining the pressure in the crankcase of the compressor constant when the revolution speed of the compressor is increased and when the heat load in the evaporator is decreased.

Another object is to provide such an apparatus which includes improved means for driving certain parts from the internal combustion engine of the vehicle, and for engaging and disengaging the drive of such parts with and from the engine.

Another object is to provide such an apparatus which includes means, driven by the vehicle engine, for generating electric power to drive the evaporator fan.

Another object is to provide such an apparatus which includes an electric motor for driving certain parts and means for connecting the motor with a source of electric current supply when the vehicle is at a standstill.

Another object is to provide such an apparatus which includes a conduit interconnecting the refrigerant feed line to the evaporator and the suction line therefrom for the purpose of balancing the pressure in the system.

Another object is to provide such an apparatus in which the conduit interconnecting the feed line and suction line is provided with a pressure regulating valve, preferably automatic and of the constant pressure type.

Another object is to provide such an apparatus which includes means for bringing the compressor discharge line and suction line from the evaporator into heat exchange relation for imparting heat from the former to the latter and promoting vaporization of the refrigerant in the suction line.

Another object consists in providing such an apparatus in which the said means for bringing the discharge and suction conduits into heat exchange relation is of improved form.

A further object consists in providing certain improvements in the form, construction and arrangement of parts whereby the above named objects, and others inherent in the invention, may be efficiently attained.

A practical embodiment of the invention is represented in the accompanying drawings in which:

Fig. 1 represents a diagrammatic layout of the apparatus or system arranged for installation on an engine driven truck;

Fig. 2 represents a detail longitudinal section, partly in elevation and on an enlarged scale, of one form of means for bringing the compressor discharge and suction lines into heat exchange relation;

Fig. 3 represents a detail side elevation of a modified form of such heat exchange means;

Fig. 4 represents an end view of the parts shown in Fig. 3;

Fig. 5 represents a view similar to Fig. 2 of a second modified form of such heat exchange means; and Fig. 6 represents a section taken in the plane of the line VI—VI of Fig. 5, looking in the direction of the arrows.

In refrigerating systems it is highly desirable to achieve balance at a predetermined desired pressure and temperature for a certain heat load in the evaporator. When however, there is a reduction in the said heat load, an interrelated reduction takes place in the compressor crankcase pressure which entails a reduction in the amount of refrigerant handled by the compressor per time unit and thus reduces the refrigerating capacity of the system. Indeed, if the heat load in the evaporator is radically reduced, the crankcase pressure of the compressor may fall to a point which is deleterious to the system. A similar condition is apt to occur if the heat load in the evaporator remains substantially constant while the revolution speed of the compressor increases, as might be the case when the system is mounted on an engine driven vehicle and the compressor is powered by the said engine. The present invention is calculated to obviate such undesirable conditions and to permit the heat load in the evaporator to be varied and the vehicle to be driven at desired speed without any concern for the effect upon the crankcase pressure in the compressor.

Turning now to the drawings, the platform of an engine driven vehicle, such as a truck, is denoted by 1, and mounted thereon is an internal combustion engine 2, for driving the truck and also actuating the refrigerating system. The compressor of the system is marked 3, the condenser 4, and the receiver 5. As these three parts or elements of the system may be of any well known or approved form, and their particular construction constitutes no part of the present invention, it is deemed unnecessary further to illustrate or describe them.

The evaporator of the system is indicated by 6, and its inlet is connected with the outlet of the receiver 5 by the usual refrigerant supply line 7, in which is the customary thermostatic expansion valve 8. A modulating valve 9 controlled by a suitable unit such as a refrigerator thermostat 10, or other equivalently functioning valve, may also be installed in the refrigerant supply line 7 for controlling the flow of the refrigerant to the evaporator, if desired, and a manually operated metering valve 11 may also be positioned in the line.

The discharge of the compressor is connected with the inlet of the condenser by the usual hot gas line 12, and the condenser is connected with the receiver by a conduit 13. The outlet of the evaporator is connected with the inlet of the compressor by the suction line 14, and a feeler bulb 15 is fitted on the said suction line for controlling expansion valve 8 through a capillary tube, as is well understood in this art. It will be observed that there is a zone, indicated generally by reference numerals 12 and 14, in which the compressor discharge line and suction line lie close together, and this proximity is such as to establish heat exchange relation between the said two lines for transferring heat from the discharge line to the suction line. As shown in the drawing, the said two lines are in parallelism in this zone, but they could be intertwined spirally, if desired, provided they are maintained in heat exchange relation.

A conduit 16 interconnects the refrigerant supply line 7 with the suction line 14, the point of connection with the supply line being intermediate modulating valve 9 and metering valve 11, and the point of connection with the suction line being intermediate the feeler bulb 15 and the zone in which the compressor discharge line 12 and the suction line 14 are in heat exchange relation, and preferably close to said zone. In the conduit 16 is located a regulating valve 17, which is of the constant pressure type for controlling the pressure balance in the system, as will hereinafter be described. As the construction and functioning of such valves are well known to and understood by operatives in this industry, the said valve is appropriately indicated in a diagrammatic way and will not be further shown or described with respect to its structure.

A belt pulley 18 is suitably mounted on the driven shaft of engine 2 and is arranged to be brought into and out of connection therewith by a clutch 19, which may be of any well known or approved form and manually operable in any suitable way. Another belt pulley 20 is fixed to the shaft of the compressor 3, and a further pulley 21 is rigid on a shaft of the condenser fan 22. An electric generator 23 is mounted on the truck platform 1 on the side of the engine 2 opposite the compressor and the said generator has a belt pulley 24 fixed to the shaft thereof. All four of said belt pulleys, 18, 20, 21 and 24, are embraced by a drive belt 25 whereby, when the pulley 18 is clutched to the shaft of engine 2, its rotation will correspondingly rotate the pulleys that drive the compressor, the condenser fan and the electric generator. The said generator 23 is in electrical connection through a wire 26 which is suitably grounded at 27 and 28 with an electric motor 29, which is adapted to drive the evaporator fan 30. It will thus be seen that the engine 2 will not only serve to drive the truck itself but will also activate the compressor, the electric generator and the fans for the condenser and evaporator. The usual storage battery (not shown) is, of course, provided for the engine.

An electric drive motor 31 is also mounted on the truck platform 1, and its belt pulley 32 is connected by a belt 33 with a pulley 34 that is fixed on the shaft of compressor 3 alongside pulley 20. The said drive motor 31 is fitted with a jack or plug-in 35 for connection with any suitable source of electric current supply, and it will thus be seen that, when the truck is at a standstill, as for instance in a garage, the clutch 19 of the engine 2 may be disengaged and the compressor, generator, and fans for the condenser and the evaporator may be operated by the motor 31.

In the operation of this system, when the truck is in motion powered by its engine 2, the system will operate normally in a manner which is deemed to require no detailed explanation. If, however, the pressure balance of the system tends to be upset either by diminishing the heat load in the refrigeration chamber or by increase in speed of compressor rotation due to the engine drive, the constant pressure valve 17, which has previously been set to open at a predetermined pressure, will open and permit liquid refrigerant to cross from the supply line 7 into the suction line 14 without passing through the evaporator, thereby raising the pressure in the crankcase of the compressor 3 and maintaining balance in the system. This tendency to unbalance the system by the high speed of the compressor will most often arise when the truck is in motion because it is driven by the truck engine and it would be undesirable and difficult, if not impossible, to control the compressor speed by reduction in driving speed of the truck. The tendency to unbalance the system due to diminishing the heat load on the evaporator will more usually occur when the truck is at a standstill, or when the temperature in the refrigerated body has been satisfied. However, regardless of the actual facts in these connections, the constant pressure valve 17 will serve automatically to maintain the pressure balance in the system and avoid the occurrence of undesirably, and possibly injuriously, low pressure in the compressor crankcase.

The proximity of the zones of the discharge line 12 and suction line 14, hereinabove described, which brings them into heat exchange relation, will cause the heat transferred from the discharge line to the suction line to vaporize any liquid refrigerant which may be passing through the suction line in the normal operation of the system when the valve 17 is closed, or will at least prevent the outer surface of the suction line from accumulating moisture by maintaining its temperature above the dew point of the surrounding air, thus eliminating the necessity of insulating the conduit, serving as a safety means in case of evaporator overflooding, and promoting efficiency. This heat exchange will also serve to vaporize the liquid refrigerant passing through the valve 17 and conduit 16 into the suction line 14 when the constant pressure valve 17 is open for the purpose of balancing the system, at which time the coefficient of heat transfer rises sharply. The point of connection of the conduit 16 to the suction line 14 should, preferably, be close to the zone of heat exchange between the discharge and suction lines in order to avoid the accumulation of ice on the suction line or the dripping of moisture therefrom.

This interchange or passing of heat from the compressor discharge line 12 to the suction line 14 may be facilitated or enhanced by the provision of a heat exchange device or unit, one form of which is illustrated in Fig. 2. In this construction, the suction line 14 has a portion thereof formed into a coil 36 which is surrounded by a fluid tight casing 37 that is in communication with the discharge line 12 at an inlet point 38 and an outlet point 39. It will be clear that, in this arrangement, the hot gas refrigerant entering the casing 37 will heat the coil 36 of the suction line and serve to vaporize any liquid refrigerant therein coming either from the evaporator 6 or through the constant pressure valve 17 and conduit 16.

A modified form of this heat exchange unit which may be substituted for the juxtaposed conduit portions 12, 14, is illustrated in Figs. 3 and 4, wherein the discharge line 12 is bent into a pair of sinuous portions 40, 40, within which similarly formed sinuous portion 41 of suction line 14 is positioned. The said sinuous portions of the two lines are held in position and transfer of heat from the discharge line to the suction line is facilitated by a group of fins 42, which are composed of heat conducting material and are thermally bonded with the sinuous portions of the said discharge and suction lines. A current of air, from a fan or the like may be passed through the said fins.

A second modified form of this heat exchange unit is shown in Figs. 5 and 6, wherein the suction line 14 passes through a fluid tight casing 43 which is connected by inlet 44 and outlet 45 with compressor discharge line 12, so that the interior of the casing and the portion of the suction line 14 passing therethrough are heated by the hot discharge gas. This heat exchange may be augmented by a series of longitudinally disposed fins 46 that project radially from the outer surface of the portion of the suction line 14 that is within casing 43 and may contact the inner wall of the said casing, the said fins being, of course, composed of heat conducting material. The heat exchange may be further facilitated by providing the exterior of the casing 43 with a group of fins 47 and passing a current of air, as from a fan, therethrough.

The mode of operation of the apparatus is the same whether the discharge line 12 and suction line 14 be merely placed in juxtaposition, as shown in Fig. 1, or the form of heat exchange device shown in Fig. 2 employed; and, as the operation of the apparatus shown in Fig. 1 has been hereinabove described, there appears to be no occasion to make further recitation touching the same. But there is a difference when either form of heat exchange device shown in Figs. 3 and 4 or 5 and 6 is used because each of these devices is additionally capable of performing the function of the condenser 4; so that the latter may be omitted from the system and the compressor discharge line may lead from either said device directly to the receiver 5. Thus, each of the two devices of Figs. 3 and 4, and 5 and 6, may be described as a combined condenser and suction line heat exchanger.

It will be understood that the utility of the apparatus is not limited to vehicle installation, but that it may have any stationary base; and that various changes may be resorted to in the form, construction and arrangement of the several parts without departing from the spirit and scope of the invention, and hence I do not intend to be limited to details herein shown or described except as they may be included in the claims or be required by disclosures of the prior art.

What I claim is:

1. A refrigeration system of the character described comprising, a compressor, an evaporator, a heat dissipating refrigerant supply conduit connecting the discharge of the compressor with the inlet of the evaporator, a refrigerant suction conduit connecting the outlet of the evaporator with the inlet of the compressor, a system capacity balancing conduit connecting said supply conduit with said suction conduit to permit flow of refrigerant from said supply conduit to said suction conduit for maintaining constant pressure in the compressor crank case, automatic pressure regulating means positioned in said capacity balancing conduit and subject to the pressure in said suction conduit, and a heat exchanger forming portions of said supply and suction conduits constructed and arranged for condensing refrigerant flowing from the compressor to the evaporator and vaporizing liquid refrigerant returning to the compressor through the capacity balancing conduit and any that may be returning from the evaporator through the suction conduit.

2. A system as defined in claim 1, in which the heat exchanger is constructed as a combined condenser and vaporizer.

3. A system as defined in claim 2, in which the combined condenser and vaporizer comprises sinuous portions of the supply and suction conduits thermally connected by a group of common fins through which said conduits pass.

4. A system as defined in claim 1, which is adapted for combination with a motor vehicle, and which includes an internal combustion engine for driving both the vehicle and the compressor.

5. A refrigeration system of the character described comprising, a compressor, a condenser, an evaporator, a hot gas conduit connecting the discharge of the compressor with the condenser, a refrigerant supply conduit connecting the condenser with the inlet of the evaporator, a refrigerant suction conduit connecting the outlet of the evaporator with the inlet of the compressor, a system capacity balancing conduit connecting said supply conduit with said suction conduit to permit flow of refrigerant from said supply conduit to said suction conduit for maintaining constant pressure in the compressor crank case, and automatic pressure regulating means positioned in said capacity balancing conduit and subject to the pressure in said suction conduit, said system being adapted for combination with a motor vehicle and also including an internal combustion engine for driving both the vehicle and the compressor, an electric motor for driving the compressor, and means for engaging and disengaging the internal combustion engine with and from the compressor.

6. A refrigeration system of the character described comprising, a compressor, a condenser, an evaporator, a hot gas conduit connecting the discharge of the compressor with the condenser, a refrigerant supply conduit connecting the condenser with the inlet of the evaporator, a refrigerant suction conduit connecting the outlet of the evaporator with the inlet of the compressor, a system capacity balancing conduit connecting said supply conduit with said suction conduit to permit flow of refrigerant from said supply conduit to said suction conduit for maintaining constant pressure in the compressor crank case, and automatic pressure regulating means positioned in said capacity balancing conduit and subject to the pressure in said suction conduit, said system being adapted for combination with a motor vehicle and also including an internal combustion engine for driving both the vehicle and the compressor, a motor powered fan for the evaporator, a generator for the fan motor, and a single driving belt connecting the internal combustion engine with the compressor and the generator.

7. A system as defined in claim 6, which also includes a fan for the condenser, and in which the driving belt also connects with the condenser fan.

References Cited in the file of this patent

UNITED STATES PATENTS

| | | |
|---|---|---|
| 1,858,517 | Marshall | May 17, 1932 |
| 1,911,012 | Buvinger | May 23, 1933 |
| 1,984,912 | Banning, Jr. | Dec. 18, 1934 |
| 2,080,358 | Kucher | May 11, 1937 |
| 2,266,187 | Fitzgerald | Dec. 16, 1941 |
| 2,311,622 | Alexander et al. | Feb. 23, 1943 |
| 2,385,667 | Webber | Sept. 23, 1943 |
| 2,451,385 | Groat | Oct. 12, 1948 |
| 2,459,173 | McCloy | Jan. 18, 1949 |
| 2,523,451 | Schulz et al. | Sept. 26, 1950 |